Patented Dec. 21, 1948

2,456,629

UNITED STATES PATENT OFFICE 2,456,629

SOLUBLE AND INFUSIBLE SYNTHETIC RESINS AND METHOD OF PRODUCING THE SAME

Gilbert B. Gehrenbeck, White Bear Lake, Minn., assignor to Minnesota Mining & Manufacturing Company, St. Paul, Minn., a corporation of Delaware No Drawing. Application January 15, 1942, Serial No. 426,896

6 Claims. (Cl. 260—22)

This application is a continuation-in-part of copending application Serial No. 358,368, filed September 25, 1940, by Henry N. Stephens, Donald R. Guthrie and myself.

The present invention relates to resinous products, especially to a new type of product which is a soluble and infusible synthetic resin, and to methods for their production. A salient aspect of this invention concerns resinous products which are adapted to be dissolved in certain organic solvents for various uses, and which will not liquefy when heated.

This application is a continuation-in-part of the copending application of Henry N. Stephens, Donald R. Guthrie and myself, Serial No. 358,368, filed September 25, 1940, now Patent No. 2,404,411.

The resinous product herein described may generally be characterized as a non-fusible resinous material which is soluble in certain organic solvents, e. g. acetone, butyl acetate, toluol, etc., and when so dissolved or suitably thinned provides coating compositions and/or cements having special properties. The cements, for example, may be used to advantage in adhering leather to metal, coated or treated paper to metal, and for other difficult adhesion problems. Whereas many solvent type rubber cements provide good adhesion to metal, they do not provide good adhesion with leather over long periods of time, perhaps because of oils in the leather. On the other hand, whereas hide glue quite readily adheres to leather, its adhesion to metal is quite poor. Cements as herein defined have the virtue of adhering well to both metal and leather, as well as to a number of other materials. The base of such a cement is a suitable synthetic resinous material, e. g. as above referred to.

I shall first describe a preferred resinous material for my purposes which is, itself, believed by me to possess important patentable novelty.

A preferred resinous material contemplated by me is a type of alkyd resin. More particularly it comes within the general class of alkyd resins made by first producing an adduct of an acid or anhydride such as maleic acid with a conjugate double bond compound such as China-wood oil or China-wood oil acid, and then reacting the resulting adduct with a dihydric or polyhydric material such as glycerine or ethylene glycol, and/or a polyamino compound such as diethylene triamine, to form ester and/or amide linkages. I am particularly concerned with resins coming within this general class which have the combined characteristics of being both non-fusible and at the same time soluble in organic solvent such as acetone, butyl acetate, toluol, and the like.

Others have prepared esters of adducts, but not of the type or character herein described, to the best of my knowledge. For example, British Patent No. 407,957 (1934) of Morrell, Marks and Samuels describes the production of a so-called adduct; that is, this British patent describes reacting together China-wood oil and maleic anhydride to produce the adduct thereof. The resulting material is suggested for use as a varnish or enamel, which may be set up by baking or may be dried by use of cobalt or manganese driers. This British patent also describes increasing the viscosity of such varnish-like adducts by a certain degree of esterification thereof with a dihydric or trihydric alcohol, and suggests certain methods therefor. The degree of esterification of the product of this British patent, produced by heating the adduct with the polyhydric alcohol, is only sufficient to increase the viscosity of the glycerine-adduct mixture to make it more suitable for certain varnish uses: see page 4, end of column 2, of the British patent. The esterified product is a "fusible" resinous material, i. e. it becomes less viscous when heated and will melt, i. e. will liquefy, if heated up to the temperature to which it was heated in making the same. The British patent is really concerned with the making of a liquid or balsam, as distinguished from a gelled resin.

On this general subject, as background of the prior art, reference is also made to the "Chemistry of Synthetic Resins," by Carleton Ellis, 1935 edition, volume 2, chapter 40, entitled: "The Diene Synthesis." In this chapter, particularly at page 858, a description is given of the production of an adduct of eleostearic acid (i. e. China-wood oil acid) and maleic anhydride; this is an example of the diene synthesis. Since eleostearic acid has three sets of double bonds in its molecular structure so situate that either two of the three sets of double bonds may be considered a conjugate double bond system, it will be evident that two possibilities exist in the production of the adduct. That is, the adduct will differ somewhat depending upon whether the maleic anhydride joins into the eleostearic acid molecule with one set of conjugate double bonds or with the other. To distinguish between these two adducts, the book by Ellis, at page 858, refers to the alpha-eleostearic acid-maleic anhydride adduct and the beta-eleostearic acid-maleic anhydride adduct. As before indicated no novelty is claimed in making this particular adduct or in making an esterification product thereof.

Reference is also made to Patent No. 2,146,671 of Carleton Ellis as prior art. It will be seen that the patentee was concerned with the production of a soluble glyceride of an adduct such as tung-maleic adduct, but secured the same by stopping his esterification or condensation so that he still had a fusible semi-solid resinous mass: see page 1, column 1, line 42 of the Ellis patent. If Ellis' particular reactants were reacted or condensed far enough to produce a non-fusible resin, the resulting material would not have been soluble in toluol, acetone, and the like.

One of the objects and accomplishments of the present invention is that I produce a resinous material of the general type indicated which is carried beyond the fusible stage, i. e. into the infusible stage, but yet in final form is soluble in acetone, butyl acetate, toluol and the like. Illustrative methods of accomplishing this objective are given herein below.

Another object of this invention is to provide a resinous material which can be applied as a coating, for example to metal surfaces, in the production of various articles, e. g. refrigerator boxes, and will set to form a non-fusible hard, tough coating merely upon the evaporation of solvent and exposure to air at room temperatures or higher.

Another object is to produce a solvent type synthetic resinous cement having new and advantageous characteristics.

A further object is to produce composite articles, for example chairs or the like, comprising metal covered with leather, the leather being joined to the metal with a synthetic resin cement as hereinafter more fully described.

These and other objects and advantages will appear from the description taken as a whole.

I will first describe illustrative methods of making my soluble and non-fusible synthetic resinous material.

*Example I*

|  | Pounds |
|---|---|
| Tung (China wood) oil | 60 |
| Maleic anhydride | 20 | are heated to about 70 to 80° C., whereupon a strong exothermic reaction sets in which, with continued stirring, raises the temperature 40 or 50° C.; that is, brings the temperature up to 120° C. or of that order. Additional heat is supplied during and/or following this strong exothermic reaction to bring the final temperature of the mass up to about 160° C. to insure completion of the reaction. An ordinary open enamel kettle may be used as a container for the mass and may be heated with a gas flame or by any other suitable means.

The whole mass is then cooled to about 80° C., and then is chlorinated. The desired chlorination reaction is effected by first adding to the mass a catalyst (which is advantageous but not essential) consisting of 36 grams of iodine dissolved in 360 c. c. of ethyl alcohol. Gaseous chlorine is then introduced into the mass, as by use of a perforated glass tube immersed in the mass. During the introduction of the chlorine the mass is constantly stirred as with a glass or enamel covered mechanically driven stirrer, and the introduction of chlorine is continued until about 10 lbs. of gaseous chlorine have been taken up by the mixture. The chlorine is preferably introduced so that it is dispersed uniformly throughout the mass in small bubbles, in order to intimately contact all portions of the mass. The chlorination is an exothermic reaction but the rate of reaction decreases as the chlorination continues, with a consequent decrease in the evolution of heat. While the evolution of heat is sufficient near the beginning of the reaction to maintain the temperature at around 80° C., toward the end of the reaction some heat ordinarily should be supplied to prevent the temperature from dropping off. 80° C. is not critical for this reaction. Lower temperatures such as 70° C. or 60° C. can be employed. However the mass has a more favorable viscosity for chlorination at the higher temperature of 80° C. and also the reaction proceeds at a more feasible rate. However if the temperature of the batch is allowed to rise much above 80° C., the color of the finished product becomes very dark and a great deal of HCl is given off. The product seems better when made at a temperature of the order of 80° C. or at lower temperatures. It will be understood that an entirely satisfactory product can be made at temperatures of the order of 70° C. or lower, the problem being to provide a suitable rate of reaction and suitable contact between the gaseous chlorine and the adduct mass, and further to maintain the viscosity of the batch low enough so that mechanical mixing can be carried out.

It will be noted that when 10 lbs. of gaseous chlorine are taken up by the adduct mass, the chlorine will be present to the extent of about 12½ percent of the weight of the unchlorinated adduct. Higher or lower percentages of chlorine may be used, e. g. from 5 to 15 or 20 percent, but ordinarily adducts in which the chlorine is present from 10 to 14 or 15 percent of the unchlorinated adduct are preferred.

1000 grams of the chlorinated adduct, made as just described, were placed in an enamel kettle with 139.5 grams of glycerine. The mass was heated gradually to 160° C. Gases or vapors were given off as the temperature rose and this tended to cause foaming. It will be appreciated that one of the by-products of an esterification reaction is water. One method which I have employed for minimizing the foaming difficulty is to bubble a suitable gaseous material through the mass while it is being heated. Sulphur dioxide works well for this purpose. When the mass has been brought up to 160° C., or of that order, it is maintained at this temperature, with constant stirring, until the esterification reaction has proceeded far enough so that mass gels. This point of gelation is very marked in a reaction of this kind. While it is true that, before gelation, the mass gradually increases in viscosity with continued heating, the point of gelation represents a very marked change and occurs quite suddenly. Prior to gelation, when a glass rod is lifted out of the mass, the material which clings to the rod will come away from the main body of material but will then flow from the rod back into the pan as a free flowing liquid. After gelation (which might be but a minute or two later) the gel will commonly not come away from the main body or mass but will stretch out between rod and mass of material in the kettle, break away at or near the rod, and snap back into the main mass in the kettle.

The resulting glycerine-adduct resinous ester, after being reacted to the stage just described (and after cooling), can be employed for various purposes. One important use is in the making of cements. The ester can be dissolved in acetone to the extent of three parts of ester to seven parts of acetone, and the resulting cement can be employed for a number of unique uses. For example it can be employed to join leather to iron, nickel or other metal surfaces.

The resinous glycerine-adduct ester just described has the unique property of being, at one and the same time, soluble in various materials such as acetone, butyl acetate and the like, and at the same time being an infusible type of resin.

In the above example instead of employing tung or China-wood oil, other oils, particularly those which have at least one conjugate double bond system, or else in which a conjugate double bond system in the molecule is produced by conditions of the reaction or by other special treatment, may be used. Examples are oiticica oil, the beta modification of tung oil, certain treated linseed oils, etc. While dehydrated castor oil will react with maleic anhydride to produce an adduct, the resulting product is a solid gel which it is difficult to chlorinate for mechanical reasons, i. e. because of the difficulty of securing intimate contact between the solid adduct and the gaseous chlorine. Of course a liquid or solid reagent can be employed under such circumstances, if desired, to minimize the mechanical difficulty.

The corresponding oiticica oil resinous ester is somewhat softer than that produced with ordinary raw tung oil. There is some slight difference between the resin produced in employing alpha and beta eleostearin; however, this difference is not nearly as marked as the difference between the resin produced with tung oil (i. e. alpha eleostearin) and that produced with oiticica oil.

In place of chlorine, I have also successfully employed other reagents to secure my resins having the special property of being soluble in acetone and the like, while at the same time being of the infusible type. Among these other reagents are stannic chloride, sulfuryl chloride, hydrogen chloride and sulphur. Chlorine is illustrative of the halogens; bromine may also be used.

Stannic chloride will react with the adduct, and the glyceride or ester produced with such an adduct will be a tough resin. The stannic chloride possesses an advantage in certain situations in that it may be added as a solid (where reaction with gaseous chlorine may be difficult mechanically). However, stannic chloride is relatively expensive compared with chlorine and also leaves a water-soluble salt, i. e. stannous chloride, in the reaction product which is sometimes undesirable, as from a corrosion point of view.

Sulfuryl chloride reacts with the adduct, adding about 40 percent of its chlorine; however, the amount of chlorine added varies with the conditions of the reaction. This reagent can be added as a liquid at room temperatures and under some special circumstances is more desirable for this reason than gaseous chlorine. The final glyceride-adduct resins produced by this route are apparently equal in quality with those made with an equal amount of chlorine added as a gas. Addition of the chlorine by this reagent is more expensive as will be obvious.

By another method, the reaction with sulfuryl chloride may be accomplished after the esterification of the adduct. The insoluble and infusible resin formed by reaction of an adduct with a polyhydric alcohol may be suspended in a vehicle such as toluene, for example, by immersing it in a suitable swelling agent and later breaking up the swollen mass by vigorous agitation, as with a paddle-type or propeller type stirrer. Subsequent addition of sulfuryl chloride to the suspension (e. g. at about room temperatures) gradually brings the previously swollen but insoluble resin to a soluble state, yielding a limpid solution at the concentration used (for example, 25 to 35 percent solids). Other equivalent means of swelling and dissolving the insoluble resin may be employed, such as introducing a suitable organic liquid into freshly formed gel while still hot and plastic, agitating the same, and subsequently, after reducing the temperature, adding sulfuryl chloride. This latter method is preferable, especially where large batches are involved. These procedures, in addition to their technological advantages, also have the advantage of keeping the mixture free of sulfuryl chloride or the like (including other acid chlorides such as phosphorous oxychloride) until after the reaction of gylcerine, or other alcohols or amino compounds, with the adduct has taken place; such reactions commonly take place at elevated temperatures and this procedure avoids heating after addition of the sulfuryl chloride or the like.

There follows a specific example of the method just discussed:

*Example Ia*

| | Grams |
|---|---|
| Tung oil | 608 |
| Maleic anhydride | 142.5 | were heated to 160° C. with stirring. Heating was continued to 180° C. 88 grams of mannitol were added, heating and stirring being continued at approximately 180° C. until the mass set up to a gel. The gel was swollen and suspended in 2000 grams of toluol by stirring for 24 hours, forming a gelatinous paste. To this paste were added 100 c. c. of sulfuryl chloride, slowly and with stirring, and the mixture was allowed to stand at room temperature for a further 24 hours. At this point the product was a limpid liquid, darker in color than the original paste.

For certain purposes, these limpid solutions may be used directly, for example as an adhesive or cement, producing a bonding action apparently equal to that of the resins formed from prechlorinated adduct, such as described elsewhere herein. In other cases, depending on the surfaces to be coated or on other factors, it may be necessary or desirable to aerate or otherwise treat the solution so as to remove or neutralize unchanged sulfuryl chloride or products of its decomposition or reaction with the resin. In these particular procedures (where the sulfuryl chloride or the like is added after the esterification of the adduct) it is to be noted that certain solvents such as acetone are not good substitutes for toluene, since they will react with the sulfuryl chloride. Other solvents which will not thus react are, generally speaking, suitable, however.

Where hydrogen chloride is reacted with the adduct, before esterification, as hereinabove described, the final glyceride-adduct resins produced are soluble in acetone and the like but are somewhat softer than those produced according to Example I hereof, i. e. reacting chlorine gas with the adduct.

Sulphur will react with the adduct on heating to esterification temperatures or of that order, e. g. at temperatures of the order of 160° C. This has the advantage that the freshly formed adduct need not be cooled down before reacting with the sulphur. It also has the further advantage that the reaction with sulphur can continue, or even take place simultaneously with a portion of the esterification. With increasing amounts of sulphur (e. g. over that shown in Example II, hereinafter), solubility is further increased but the resin becomes darker in color, of less satisfactory odor and proceeds toward the brittle stage. 1–3%, e. g. 2% or so of sulphur, based on the adduct, reacts quite completely. Substantially higher percentages, e. g. above 3% or so, tend to leave insoluble, dark, flock-like material in the adduct, the presence of which it is desired to minimize for the sake of appearance.

An oxidized product, prepared by blowing air through the heated adduct before esterifying, was readily soluble in acetone, butyl acetate and the like, but was dark colored, soft and sticky. Accordingly, this resin would not be as satisfactory for use as a cement as one prepared as described in Example I hereof.

In the resinification of the acid adduct, various alcohols and amines have been used. Of those esterifying and/or amide-forming agents tried, mannitol and glycerine appear to produce the toughest resins. The amount of such polyhydric alcohol employed is normally calculated on the basis of the free acid groups (or anhydride groups figured as equivalent carboxyl groups) of the maleic anhydride or equivalent; however, the resin is ordinarily set up to the gel stage before the reaction is entirely completed. Considerable variation in ratios of glycerine or equivalent to free acid groups can be employed while still producing a good resin ester.

In place of glycerine, other polyhydric compounds which may be employed include ethylene glycol, and other glycols, such as diethylene glycol and triethylene glycol. Still other polyhydric compounds which may be employed under suitable conditions include sorbitol, pentraerythritol, etc. Of the amines which may be used for this purpose, diethylene triamine is illustrative. Aniline and like monoamines and mono-hydroxy compounds such as butyl alcohol can be used to replace part of the glycerine or equivalent, with a corresponding softening of the final resin, but it is necessary that the glycerine or the like predominates over any monoamine or mono-hydroxy compound employed in order to produce an infusible resin.

In place of maleic anhydride, other chemically similar materials may be employed in which a >C=C< group is preferably activated by a carboxyl group, i. e. conjugated with a carbonyl group, although, where desired, it may be additionally activated by one or more other groups, such as carbonyl, cyanide and aldehyde groups, as well as by an additional ethylene group.

The resin of Example I and equivalent resins have excellent adhesion to almost any dry surface, and are so tough and adherent when cooled that they are very difficult to handle in this manner. Therefore, when it is desired to make a solvent type adhesive cement I prefer to dump the resin directly from the kettle in which it is made into a mixer containing a sufficient excess of either fresh solvent or dilute resin solution so that the mean temperature of the final mixture is below the boiling point of the solvent. Acetone has been used as a solvent with satisfaction. Methyl ethyl ketone, butyl acetate, and other solvents have also been used.

Whereas, hereinabove I have discussed the chlorination or other treatment of the adduct in undiluted state, I also contemplate the use of a more or less inert solvent for the adduct. Where dissolved in a solvent, for example, carbon tetrachloride, or other solvent depending upon the exact nature of the adduct and the inertness of the solvent toward chlorine, the viscosity of the adduct may be reduced sufficiently so that chlorination with gaseous chlorine is relatively simple even at room temperatures or below. By employing a suitable solvent an adduct produced from dehydrated castor oil can likewise be satisfactorily used in making the resinous ester. Sometimes the adduct is made in the solvent, in which case there may be already be sufficient solvent present to serve the purpose just described.

Additional methods and reactants for making my soluble and infusible resins will now be described.

*Example II*

|  | Grams |
|---|---|
| Oiticica oil | 100.0 |
| Maleic anhydride | 26.5 | are heated to 150° C., with stirring. The reaction is normally complete when this temperature is reached; in fact, the reaction is approximately completed at about 120° C. Yellow color is produced in the mass during the early stages of the reaction and the disappearance of this color indicates completion of the reaction. (This is equally true where tung oil is employed.) Then, while the temperature of the mass is at approximately 150° C., 16.5 grams of glycerine and 3 grams of sulphur are added, at the same time, and the mass is heated within the range of 160° to 180° C., until the resulting resinous ester gels. This point or stage of reaction will be readily evident, as was pointed out more in detail in connection with Example I hereof. The gel produced is normally of a dark brown color in this example. The resulting resin is softer than a similar gel made with tung oil.

*Example III*

|  | Grams |
|---|---|
| Tung oil | 81 |
| Maleic anhydride | 19 | were heated to 160° C., with stirring, to complete the reaction in the forming of the adduct. The mass was then cooled to room temperature and 5 grams of stannic chloride pentahydrate were added as a powder, with stirring. This mass was heated slowly to 160° C., and held at such temperature until bubbling (caused by escape of the water of hydration of the stannic chloride) ceased. Then, to this mass at 160° C., 11.8 grams of glycerine were added and the temperature maintained at or about 160° C., until the formation of a gel as hereinbefore described. The resulting resin was of infusible nature and soluble in various solvents, e. g. methyl ethyl ketone, acetone, butyl acetate, etc.

*Example IV*

|  | Grams |
|---|---|
| Tung oil | 81 |
| Maleic anhydride | 19 | were heated to 160° C., with stirring, as above described. The resulting adduct was then cooled to about 80° C. and gaseous chlorine bubbled therethrough until the weight of the adduct increased by approximately 5 percent; that is, about 5 grams of chlorine were added to and combined with the adduct. Then 11.9 grams of glycerine were added and the mass was heated to a temperature within the range of 180° to 200°

C., with stirring, and the mass was maintained at this temperature until it set up to a gel, as hereinabove described.

The resulting resin was not as soluble as resins with higher chlorine content, but could be dissolved to a rather gelatinous type of solution in various solvents such as methyl ethyl ketone and acetone, while being an infusible type of resin.

Example V 90 grs. of the chlorinated adduct, produced as in Example IV, were introduced into a glass beaker and to this was added 7.7 grs. of glycerine and 7.7 grs. of aniline, both at the same time. The mass was heated, with stirring, to a temperature of 180° to 200° C. and produced a somewhat softer resin than that of Example IV, though the resin was infusible. The resinous ester was also more readily soluble in solvents such as methyl ethyl ketone, acetone and the like.

The soluble and infusible adduct-glyceride resins of my invention have a number of uses hereinabove adverted to. When dissolved in solvents such as acetone or the like, for example to the extent of 30 percent solids, they adhere extremely well to both metal and leather, which makes it possible to make composite articles of high quality in which leather is adhered directly to metal. Whereas animal glue adheres quite well to leather, its adhesion to metal is very poor. On the other hand, whereas certain rubber cements of the solvent type adhere well to metal, they are not satisfactory adhesives for leather. Apparently the oils in the leather soften or attack the rubber cement and accordingly, over a period of time weaken it as an adhesive for leather. The cements as defined in the present application adhere well to both leather and metal over long periods of time. High quality chairs and other furniture can thus be made by attaching leather directly to metal with the solvent type synthetic resin adhesive cement of my invention.

Other uses of my resin, made up as a cement, are in attaching sweat bands into men's hats (which involves attaching leather to oiled silk, etc.), for holding the bellows of a camera in place (which involves joining leather to metal), for attaching safety or advertising emblems (consisting of little glass spheres coated on drying oil treated, resin treated or other treated paper) to a metal or painted metal panel or to wood, for attaching leather to metal in autobody construction, etc.

It will be understood that use as an adhesive cement is only one of many uses for my new type of resins, i. e. soluble and infusible synthetic resins. As distinguished from use as an adhesive cement (which involves holding two surfaces together), my synthetic resins may be employed to advantage as a coating composition, for example as a priming coat in the enameling of metal surfaces, in which case they would ordinarily be used with enough solvent to give them the desired consistency. Also they may be used as a finishing coat or enamel for metal or other surfaces. Where used as an enamel, suitable pigments (e. g. red iron oxide, etc.) and suitable fillers (e. g. talc etc.) are commonly added thereto, the nature of which are well understod in the enamel art. My synthetic resins have good elastic properties at ordinary room temperatures and also good adhesion to a wide variety of materials. In addition to adhering well to the materials above mentioned, they also adhere well to rubber, glass, wood, paper and other cellulosic materials, natural resins or varnish films, other synthetic resins such as phenol aldehyde resins, etc.

The use of chlorine reacted adducts of the type herein described, or the use of chlorine reacted esters of maleic acid-China-wood oil adducts as also herein described, or equivalents, as distinguished from simple esters of ordinary maleic anhydride-China-wood oil adducts which have not been thus treated, brings about the following advantages, among others:

(1) The resulting resin ester, condensed to the stage of infusibility, is, in its final form, soluble, e. g. in acetone and the like.

(2) The effective adhesion of the resin is increased. (The specific adhesion of resins does not necessarily correspond with, or change in line with, their effective adhesion.)

(3) The tendency of the resin to oxidize is reduced, which reduces or eliminates the susceptibility of the resin to shrivelling in film form.

It is of course true that, employing normal types of adducts heretofore available, where the reaction of the same with glycerine was stopped before the ester gelled, as in the Ellis patent, supra, the resulting ester was soluble in various solvents such as acetone, toluol and the like. However, such an ester is not an infusible resin; that is, upon heating to a temperature of the order of that at which it was originally produced, such a resinous material will become liquid and free flowing.

However my resins, as hereinabove described, will not lose their gel-like properties upon heating, and they will not liquefy, nor flow freely under the force of gravity, when reheated to the temperature at which they were originally produced, nor when heated to any temperature.

Where herein or in the appended claims I employ the term "non-fusible" or "infusible" in defining my resins I, of course, do not thereby exclude resins which will soften somewhat when heated within certain temperature ranges but I do exclude resins which will melt upon heating, i. e. will form a liquid upon heating or will freely flow upon heating.

Comparing the glyceride of my chlorinated adduct with an otherwise comparable glyceride of an unchlorinated adduct, both carried to the same degree of esterification or gelation, i. e. to the same approximate degree of molecular aggregation (same molecular weight except for chlorine), the temperature range for a given plasticity is higher for the chlorinated resinous ester than for the unchlorinated ester. The significance of this will be illustrated by the fact that, when the chlorinated resin is used for example as a cement, the resulting cement bond will be more heat-resistant than where the unchlorinated resinous ester is employed.

Other interesting variations in the resulting resin may be accomplished by hydrogenation or partial hydrogenation of the adduct, usually prior to esterification.

Important physical properties of my synthetic resins may be controlled within limits by controlling the conditions of producing the same and may be further controlled or varied by the addition, in suitable proportions, of various ingredients such as ethyl cellulose, chlorinated rubber ("Parlon," made by the Hercules Powder Company), nitrocellulose, various vinyl resins such as vinyl butyrals, etc. Wide percentage range variations of these ingredients are contemplated.

It will be understood that the illustrative methods herein described for producing soluble and infusible synthetic resins have broad application, especially in relation to solvent type cements, and cements are comprehended by the present invention whether the same comprise the particular soluble and infusible synthetic resins herein illustrated or others having similar or comparable properties.

Whereas hereinabove iodine dissolved in alcohol is given as an illustrative catalyst in producing a chlorinated adduct, other catalysts such as ferric chloride or certain other amphoteric metals or metals of changeable valence, or their chlorides, or still other suitable catalysts may be used but are not essential.

It will be noted from the above (in reference to leather) that my resins are resistant to attack by or solution in oils such as drying or non-drying oils or like glycerol esters. Also it is important that my resins are resistant to attack by, and do not dissolve in, petroleum hydrocarbons, such as gasoline, kerosene and the like. In this connection my resins have use in impregnating or treating gaskets and other porous materials, including tubing and the like, which must resist contact by oils and petroleum fractions.

Also it is to be understood that the teaching of the prior art on accentuating waterproofness of alkyd resins as a whole is also, in general, applicable in the case of my resins.

The above description is illustrative and not limiting and I comprehend all embodiments within the scope of the appended claims.

What I claim is:

1. In the preparation of a synthetic resin product, the steps which comprise preparing a tung oil-maleic anhydride adduct, next esterifying said adduct with mannitol, and then reacting sulfuryl chloride with the resulting infusible gelatinous ester.

2. In the preparation of a soluble and infusible synthetic resinous material, the steps which comprise reacting tung oil and maleic anhydride to form an adduct thereof, next esterifying said adduct with a polyhydric alcohol to an infusible gel, then dispersing and suspending the resulting ester in toluol, and next reacting sulfuryl chloride with said ester at temperatures approximating room temperatures.

3. As a new product of manufacture, the reaction product of sulphuryl chloride with the infusible gelatinous product obtained by reacting a polyhydric alcohol with the adduct of a conjugate double bond fatty oil and maleic acid.

4. The product of claim 3 in which the polyhydric alcohol is mannitol.

5. As a new product of manufacture, the reaction product of sulphuryl chloride with the infusible gelatinous product obtained by reacting a polyhydric alcohol with the adduct of tung oil and maleic acid.

6. The product of claim 5 in which the polyhydric alcohol is mannitol.

GILBERT B. GEHRENBECK.

REFERENCES CITED

The following references are of record in the file of this patent:

UNITED STATES PATENTS

| Number | Name | Date |
|---|---|---|
| 2,033,131 | Ellis | Mar. 10, 1936 |

FOREIGN PATENTS

| Number | Country | Date |
|---|---|---|
| 316,914 | Great Britain | Aug. 6, 1929 |
| 338,604 | Great Britain | Nov. 24, 1930 |